(12) United States Patent
Yasuda (10) Patent No.: US 7,572,072 B2
(45) Date of Patent: Aug. 11, 2009

(54) LENS BARRIER DRIVING DEVICE, LENS BARREL, AND IMAGE PICKUP APPARATUS

(75) Inventor: Toshiyuki Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/479,898

(22) Filed: Jun. 30, 2006

(65) Prior Publication Data

US 2007/0003273 A1    Jan. 4, 2007

(30) Foreign Application Priority Data

Jul. 1, 2005    (JP)    ............... 2005-193824

(51) Int. Cl.
G03B 17/04    (2006.01)
G02B 7/02    (2006.01)
(52) U.S. Cl. ...................... 396/349; 359/819
(58) Field of Classification Search .............. 396/84, 396/341, 348, 349, 378, 379; 359/819
See application file for complete search history.

(56) References Cited

U.S. PATENT DOCUMENTS 6,937,817 B2 *    8/2005    Yasuda ................. 396/84

2004/0042089 A1 *    3/2004    Nomura ................. 359/819

FOREIGN PATENT DOCUMENTS

| JP | 07-005547 A | 1/1995 |
|---|---|---|
| JP | 07-159855 A | 6/1995 |
| JP | 10-186453 A | 7/1998 |

* cited by examiner

Primary Examiner—Melissa J Koval
(74) Attorney, Agent, or Firm—Rossi, Kimms & McDowell, LLP (57) ABSTRACT

A lens barrier driving device that prevents an increase in the number of parts constituting a lens barrier driving mechanism and avoids light leakage from a penetrating portion. A lens barrier is disposed on an object side of a lens and is openable and closable. A transmission member transmits power to a barrier driving member. The barrier driving member opens and closes the lens barrier. A cam member is able to engage with the transmission member. A first member holds the cam member. A second member is provided with a penetrating portion. The penetrating portion is disposed between the lens barrier and the first member. A rib portion of the transmission member penetrates the penetrating portion. A light shielding portion of the transmission member shields a incident light through the penetrating portion.

19 Claims, 12 Drawing Sheets

BARREL IS SUNKEN

FIG. 13B

BARREL IS WITHDRAWN

LENS BARRIER DRIVING DEVICE, LENS BARREL, AND IMAGE PICKUP APPARATUS

BACKGROUND OF THE INVENTION

1. Field of the Invention

The present invention relates to a lens barrier driving device that drives a lens barrier in a lens barrel mounted in an image pickup apparatus such as a silver film camera or an electronic camera, as well as the lens barrel and the image pickup apparatus.

2. Description of the Related Art

Many conventional cameras have lens barrels in which lens barriers are mounted. The lens barrier shuts off a surface of a photographic lens from the outside while pictures are not taken. This thus protects the photographic lens from attachment of sebum resulting from the user's touch or attachment of dust or the like to prevent optical performance from being degraded.

Available lens barrier driving methods include a method in which a photographer manually opens and closes or mounts and removes the lens barrier and a method in which the lens barrier is automatically opened when the camera is ready for shooting and closed when the camera is in a standby or power-off state. An example of a mechanism is shown below which automatically opens and closes the lens barrier.

Figures 12A, 12B:
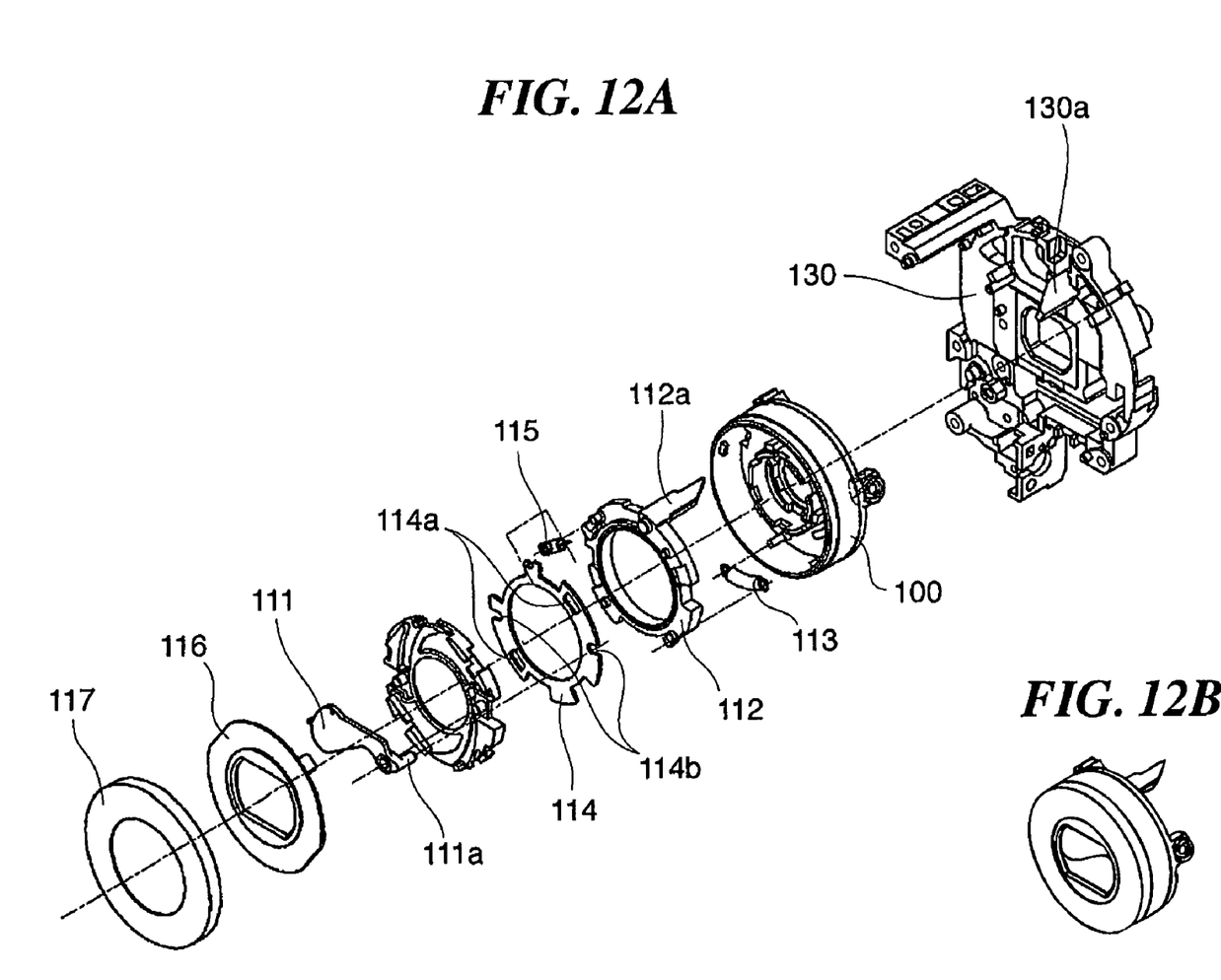
FIG. 12A is an exploded perspective view showing the components of a lens barrel according to a conventional example.
FIG. 12B is a perspective view showing the assembled lens barrel.
Figure 13A:
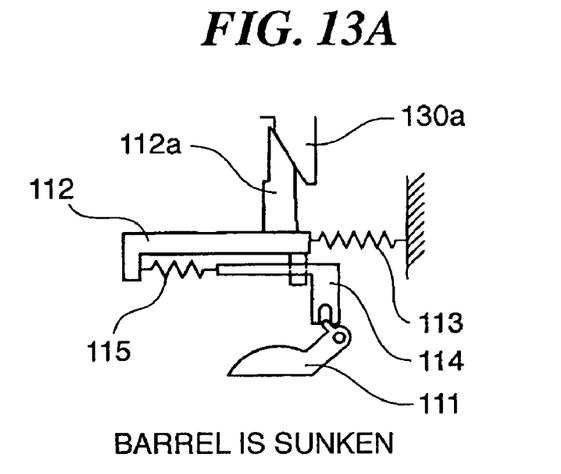
FIGS. 13A and 13C are diagrams schematically showing how a driving mechanism operates to sink the lens barrel.
Figure 13B:
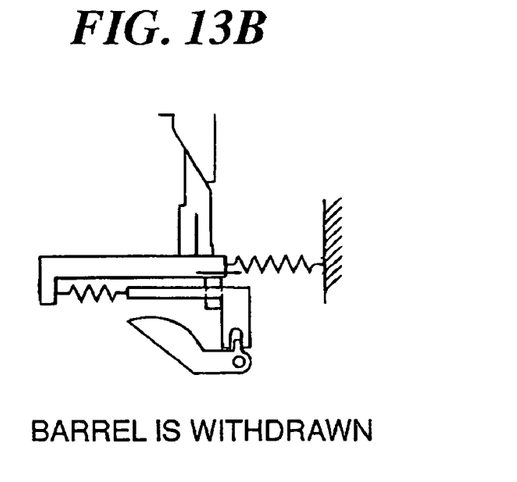
FIGS. 13B and 13D are diagrams schematically showing how the driving mechanism operates to withdraw the lens barrel.
Figure 13C:
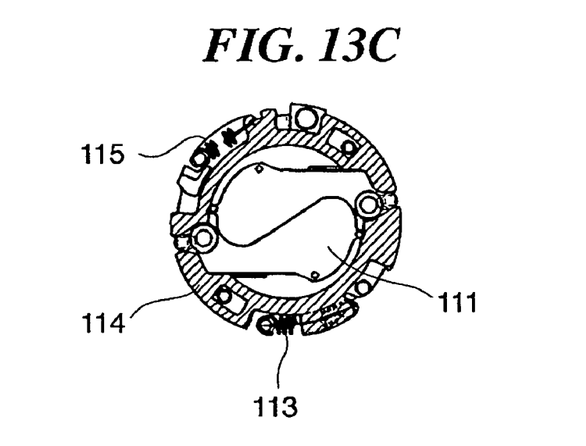
Figure 13D:
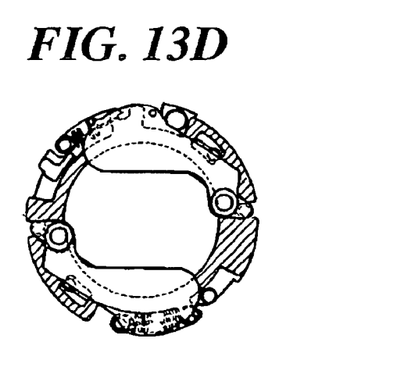

FIG. 12A is an exploded perspective view showing the components of a lens barrel according to a conventional example. FIG. 12B is a perspective view showing the assembled lens barrel. FIGS. 13A and 13C are diagrams schematically showing how a driving mechanism operates to sink the lens barrel. FIGS. 13B and 13D are diagrams schematically showing how the driving mechanism operates to withdraw the lens barrel.

In FIGS. 12A to 13D, a first group barrel 100 holds a first lens group and internally has a mechanism that drives a lens barrier 111. A barrier driving lever 112 drivingly opens and closes the lens barrier 111. A barrier opening spring 113 always biases the lens barrier 111 in a direction in which it is opened. A barrier closing spring 115 biases the lens barrier 111 in a direction in which it is closed. A lens barrier driving plate 114 drives the lens barrier 111 in the closing direction. The lens barrier driving plate 114 has a hole portion 114a and a notch portion 114b. A tapered cam member 130a is disposed on a barrel base plate 130 to open and close the lens barrier 111. Reference numerals 116 and 117 denote a barrier cover and an external cap respectively.

Using an image pickup apparatus mounted with the lens barrel described above, when a photographer suspends or temporarily pauses shooting, the lens barrel including the first group barrel 100 is housed (sunken) in the image pickup apparatus main body. During transition to the housed state, an abutting member 112a of the barrier driving lever 112 abuts against a slope near a tip of the cam member 130a (see FIG. 13A). The abutting member 112a slidably moves on the slope of the cam member 130a to rotatively drive the barrier driving lever 112. Thus, the spring force charged in the barrier closing spring 115 applies a rotative driving force to the lens barrier driving plate 114. The rotative driving force is utilized to close the lens barrier 111.

Once the lens barrel is completely housed in the image pickup apparatus main body, the photographic lens is covered with the lens barrier 111. If the state in which the lens barrel is housed in the image pickup apparatus main body is transited to an image taking enabled state, the first group barrel 100 is gradually separated from the barrel base plate 130. At this time, the spring force charged in the barrier opening spring 113 is gradually released to pivot the barrier driving lever 112 counterclockwise in FIG. 13D. Pivoting of the barrier driving lever 112 causes rotation of the lens barrier driving plate 114 and counterclockwise rotation of the lens barrier 111 to perform an opening operation.

On the other hand, a lens barrier driving method has been proposed which drives the lens barrier utilizing cam drive on the basis of the relationship between the relative positions of a first and second lens groups (see, for example, Japanese Laid-Open Patent Publication No. H07-159855).

Another lens barrier driving method has been proposed which transmits the rotating force of the rotating barrel to a transmission member and utilizes the transmitted force to drive the lens barrier (see, for example, Japanese Laid-Open Patent Publication No. H10-186453).

Another lens barrier driving method has been proposed which drives the lens barrier utilizing cam drive on the basis of the relationship between the relative positions of a first and third lens groups (see, for example, Japanese Laid-Open Patent Publication No. H07-005547).

With the conventional technique shown in FIGS. 12A to 13D, the barrier driving lever 112 and the cam member 130a are arranged as follows. To reduce the size of the lens barrel, a penetrating area is formed in a part of a barrel such as a second or third group barrel (not shown) that holds another lens group so that the barrier driving lever 112 and cam member 130a can penetrate the penetrating area. Thus, with image taking enabled, appropriately arranging the lens groups results in a cavity in the penetrating area in the second or third group barrel, which area is penetrated by the barrier driving lever 112 and cam member 130a.

This leads to a light leakage phenomenon in which external light travels through the cavity to an image forming surface, or ghosts caused by, for example, light reflected from an inner wall surface of the barrel. As a result, the optical performance may be degraded. To avoid this, the penetrating portion through which the barrier driving lever 112 and cam member 130a penetrate is provided in the direction of 12 o'clock with respect to the optical axis as observed from an object. This thus suppresses the adverse effect of light leakage. However, this structure imposes a restriction in constructing the barrel, thus reducing the degree of freedom of barrel design.

With the conventional technique described in Japanese Laid-Open Patent Publication No. H07-159855, if a lens configuration is adopted in which the first and second lens groups are brought closer to each other in an image taking area near a telescope end than when the lens barrel is sunken, the following mechanism is provided. No transmission member is provided between a barrier opening and closing ring and a cam member. Instead, a mechanism for allowing the cam member to escape is provided so as to prevent the cam member from engaging with the barrier opening and closing ring. This disadvantageously increases the number of parts required.

With the conventional technique described in Japanese Laid-Open Patent Publication No. H10-186453, the barrel holding the transmission member requires a gap corresponding to the stroke of rotation of the barrel. This may disadvantageously lead to light leakage.

The conventional technique described in Japanese Laid-Open Patent Publication No. H07-005547 reduces a variation in the spacing between the first and third lens groups in the image taking area. This technique further opens and closes the barrier using the transmission member for transmitting power to the lens group. This requires a space to be formed in the second lens group, located between the first and third lens groups, so as to allow the penetration of the transmission member. This may disadvantageously lead to light leakage in that space.

SUMMARY OF THE INVENTION

It is an object of the present invention to provide a lens barrier driving device that suppresses an increase in the number of parts constituting a lens barrier driving mechanism and avoids light leakage from a penetrating portion, ghosts, and the like which may degrade the optical performance, as well as a lens barrel and a image pickup apparatus.

To attain the above object, in a first aspect of the present invention, there is provided a lens barrier driving device driving a lens barrier which is disposed on an object side of a lens and is openable and closable, the lens barrier driving device comprising a transmission member that transmits power to a barrier driving member which opens and closes the lens barrier, a cam member that is able to engage with the transmission member, a first member that holds the cam member, and a second member that is provided with a penetrating portion, wherein the penetrating portion is disposed between the lens barrier and the first member and the transmission member comprises a rib portion that penetrates the penetrating portion and a light shielding portion that shields a incident light through the penetrating portion.

Preferably, the transmission member is supported by the second member.

Preferably, the cam member and the transmission member are not engaged with each other during photographing.

Preferably, the cam member and the transmission member are engaged with each other during non-photographing, and a cam drive between the cam member and the transmission member causes the lens barrier to open or close.

Preferably, during non-photographing, the barrier driving member and the transmission member are engaged with each other before the cam member and the transmission member are engaged.

Preferably, during photographing, the cam member advances into the penetrating portion of the second member to shield the penetrating portion together with the light shielding portion of the transmission member.

Further preferably, the lens barrier driving device further comprises biasing means that biases the transmission member so that the light shielding portion shields a space in the penetrating portion into which the cam member advances.

With the arrangement of the first aspect of the present invention, the transmission member shields the penetrating portion of the second member supporting the transmission member. This makes it possible to suppress an increase in the number of parts constituting the lens barrier driving mechanism of the second member and avoid light leakage from the penetrating portion, ghosts, and the like which may degrade the optical performance.

To attain the above object, in a second aspect of the present invention, there is provided a lens barrel comprising the lens barrier driving device described above.

Preferably, the lens barrel is of a sink type that can be housed in a housing of an image pickup apparatus.

To attain the above object, in a third aspect of the present invention, there is provided an image pickup apparatus comprising the lens barrel described above.

The above and other objects, features, and advantages of the invention will become more apparent from the following detailed description taken in conjunction with the accompanying drawings.

DESCRIPTION OF THE PREFERRED EMBODIMENT

An embodiment of the present invention will be described below with reference to the drawings.

Figure 1:
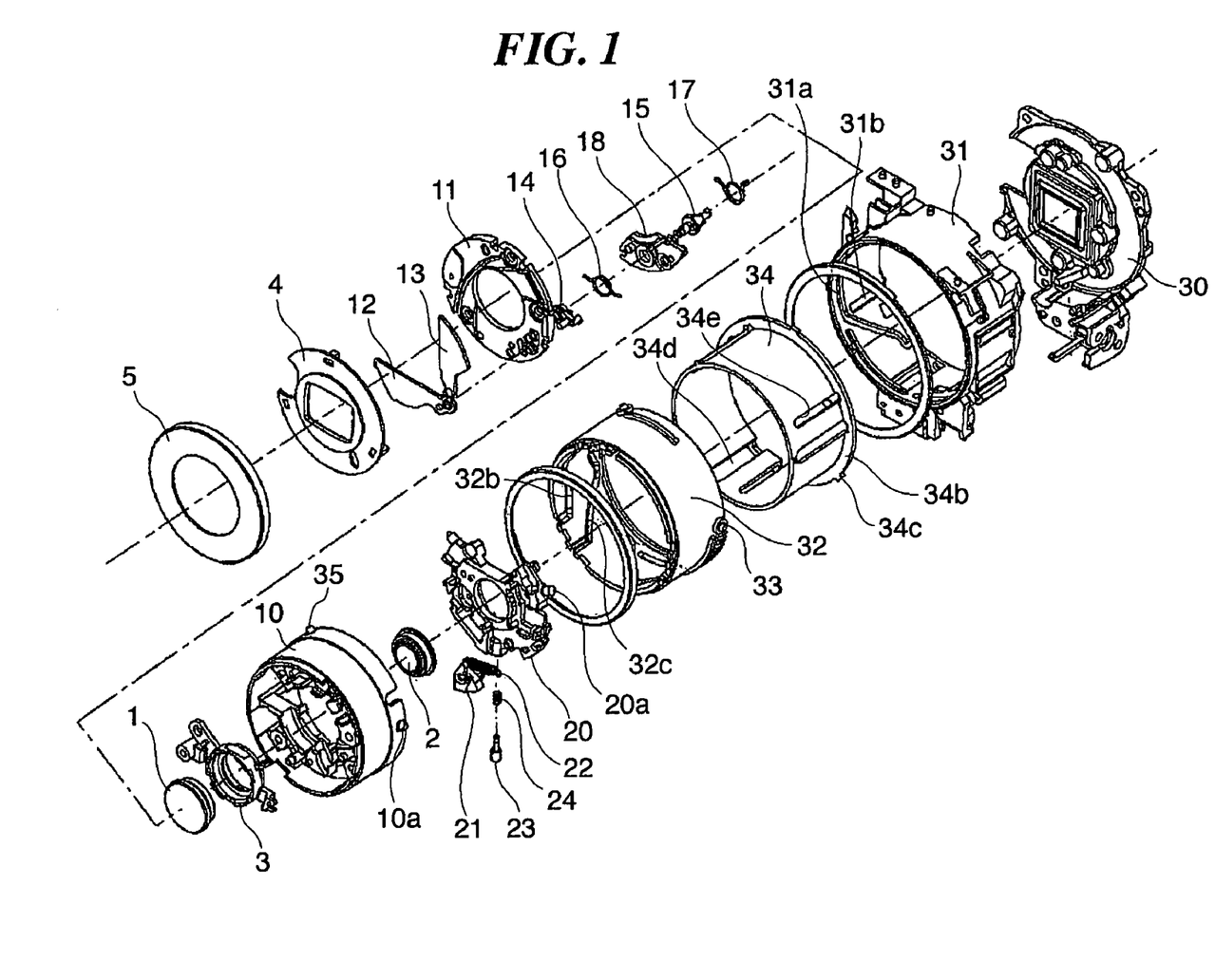
FIG. 1 is an exploded perspective view showing the components of a lens barrel according to an embodiment of the present invention.
Figure 2:
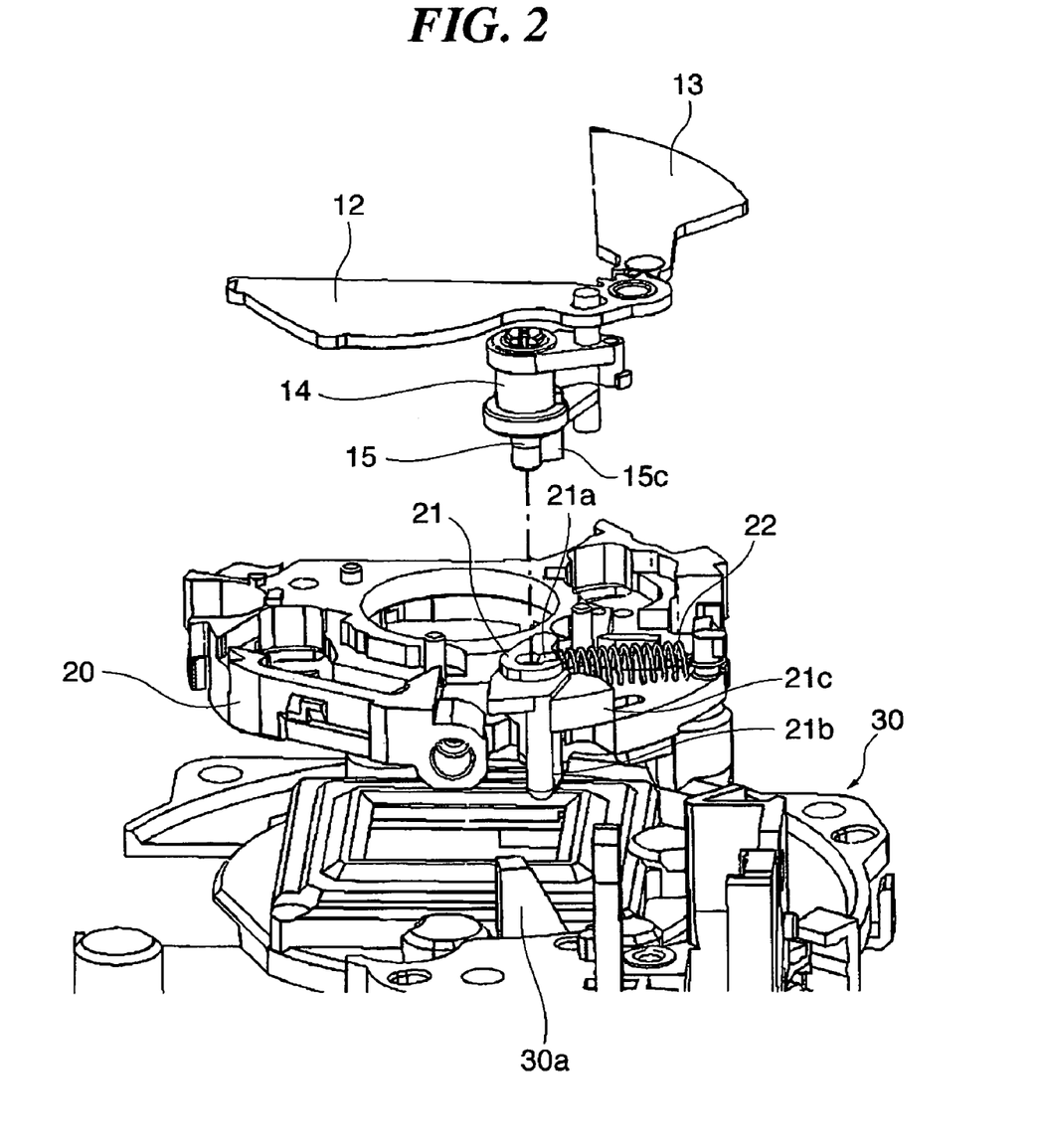
FIG. 2 is an exploded perspective view showing the configuration of a second group barrel, a transmission member, a barrier driving lever, and the like which are shown in FIG. 1.
Figure 3:
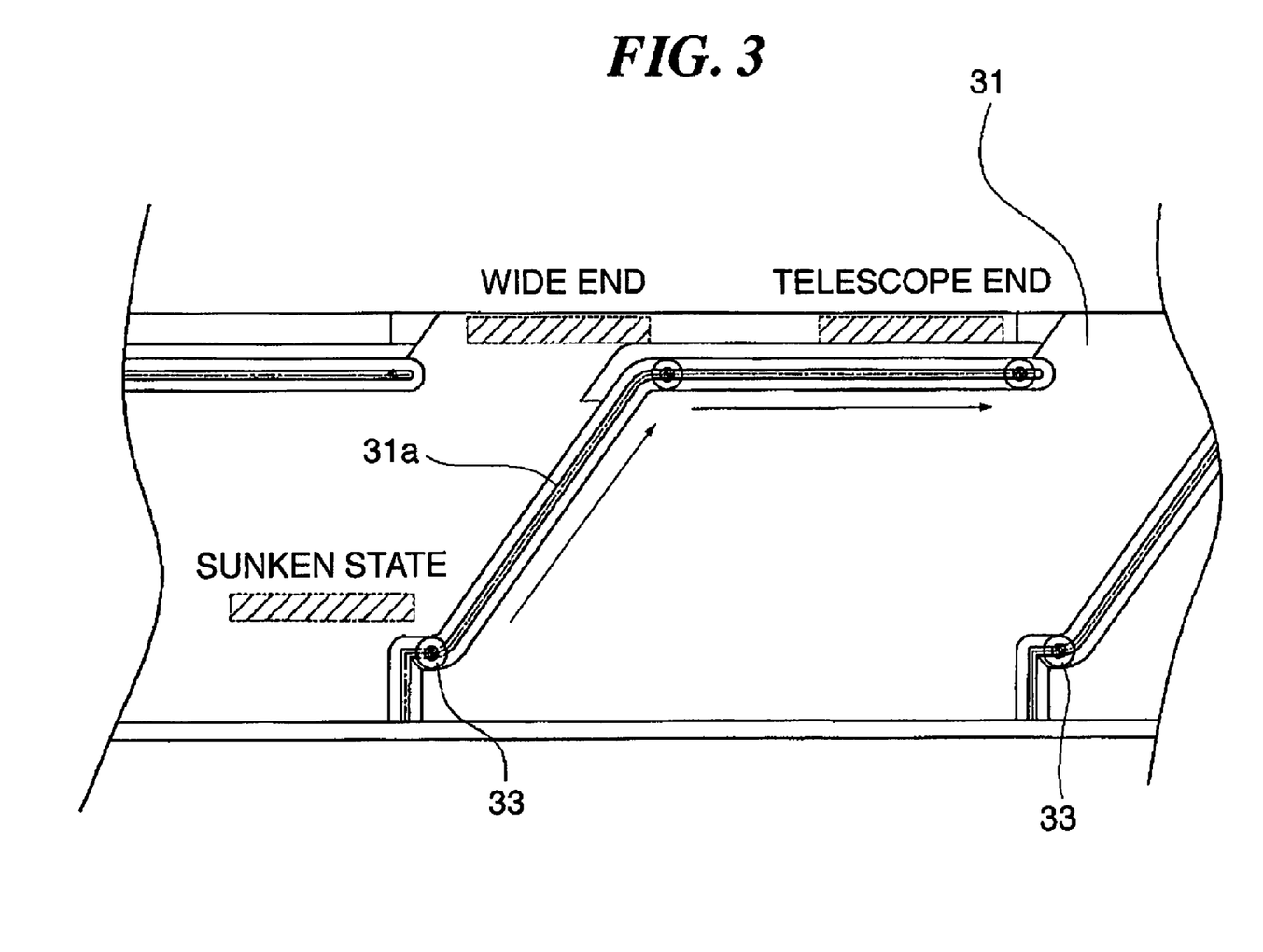
FIG. 3 is a diagram showing the positional relationship between a moving cam ring and a fixed cylinder which are shown in FIG. 1.
Figure 4:
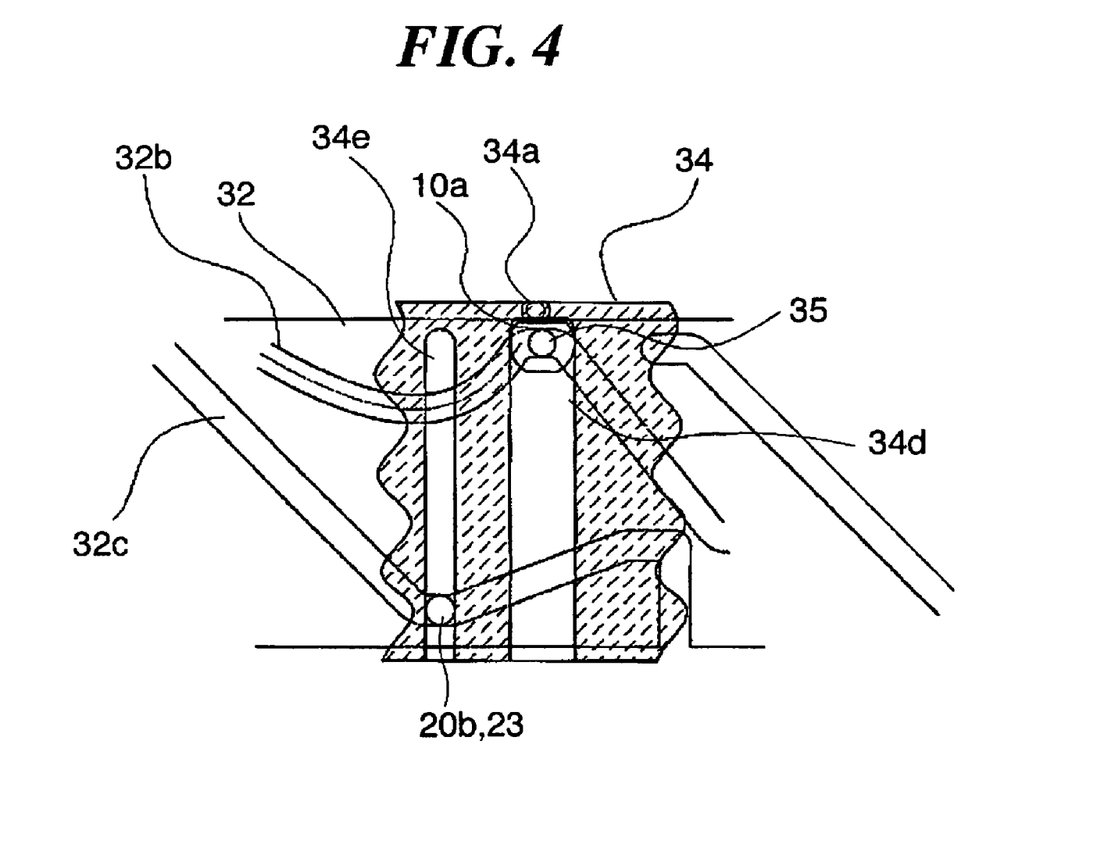
FIG. 4 is a diagram showing the positional relationship among the moving cam ring, an advancing cylinder, a first group barrel and a second group barrel which are shown in FIG. 1.

FIG. 1 is an exploded perspective view showing the components of a lens barrel according to an embodiment of the present invention. FIG. 2 is an exploded perspective view showing the configuration of a second group barrel, a transmission member, a barrier driving lever, and the like which are shown in FIG. 1. FIG. 3 is a diagram showing the positional relationship between a moving cam ring and a fixed cylinder which are shown in FIG. 1. FIG. 4 is a diagram showing the positional relationship among the moving cam ring, an advancing cylinder, a first group barrel and a second group barrel which are shown in FIG. 1.

In FIGS. 1 to 4, the lens barrel (barrel unit) comprises a first group barrel 10, a lens barrier 12, a lens barrier 13, a barrier driving lever 14, a barrier driving lever 15, a second group barrel 20, a transmission member 21, a barrel base plate 30, a fixed cylinder 31, a moving cam ring 32, and an advancing cylinder 34. The lens barrel is mounted in the image pickup apparatus. When the image pickup apparatus is powered off, the lens barrel is sunken in an axial direction and housed in the image pickup apparatus main body.

First, description will be given of the configuration of the lens barrel except for the lens barrier and lens barrier driving mechanism.

The first group barrel 10 holds a lens holder 3 holding a first lens group 1. The second group barrel 20 holds a second lens group 2. A barrier cover 4 is disposed in front of the first group barrel 10 to press the lens barriers 12 and 13. An external cap 5 is mounted in front of the barrier cover 4. The barrel base plate 30 comprises a tapered cam portion (rib portion) 30*a* as shown in FIG. 2. The tapered cam portion 30*a* has a tapered surface that abuts against a rib portion 21*b* of the transmission member 21 which will be described later. The barrel base plate 30 and fixed cylinder 31 are fixed by screws during assembly of the lens barrel.

Gear teeth 32*a* (see FIG. 9) are formed on an outer peripheral portion of the moving cam ring 32. The gear teeth 32*a* of the moving cam ring 32 engages with a gear 58 constituting a part of a zoom gear unit 50 comprising a DC motor 51 and speed reduction gear systems 53 to 58 described later. When the DC motor 51 is energized, the rotating force of the DC motor 51 is reduced by the zoom gear unit 50. The reduced force is then transmitted to the gear teeth 32*a* of the moving cam ring 32 to rotatively drive the moving cam ring 32.

Three holes (not shown) are formed on an outer peripheral surface of the moving cam ring 32 at equal intervals along a circumferential direction. Three moving cam followers 33 are pressed in the respective holes. The moving cam followers 33 are movable along a cam groove 31*a* (see FIG. 3) formed in an inner peripheral surface of the fixed cylinder 31. The moving cam ring 32 is thus rotatively driven by the DC motor 51 such that the moving cam ring 32 rotatively moves along a cam trajectory shown by arrows in FIG. 3. The gear 58 has teeth that are long enough along the direction of the optical axis so as not to disengage from the moving cam ring 32, which rotatively moves in the optical axis direction.

Cam grooves 32*b* and 32*c* are also formed in an inner peripheral surface of the moving cam ring 32. The cam grooves 32*b* and 32*c* are provided to move the first group barrel 10 and second group barrel 20 in the optical axis direction.

The advancing cylinder 34 has an outer peripheral surface fitted on the inner peripheral surface of the moving cam ring 32. A protruding portion 34*a* (see FIG. 4) is provided on one end of the advancing cylinder 34 in the axial direction. The protruding portion 34*a* is fitted into a groove formed at a tip of the moving cam ring 32. The groove in the moving cam ring 32 is formed all over the circumference of the moving cam ring 32. The advancing cylinder 34 thus rotates freely and moves integrally with the moving cam ring 32.

A flange portion 34*b* and a protruding portion 34*c* are provided at the other end of the advancing cylinder 34 in the axial direction; the protruding portion 34*c* projects from the flange portion 34*b*. The protruding portion 34*c* is fitted into an advancing key 31*b* formed in an inner peripheral surface of the fixed cylinder 31 along the optical axis direction. This regulates the movement of the advancing cylinder 34 in a direction in which it rotates when the moving cam ring 32 rotates.

Slot portions 34*d* are formed in an inner peripheral surface of the advancing cylinder 34 and parallel to the optical axis direction. Three elliptical protruding portions 10*a* are fitted into the slot portions 34*d*; the protruding portions 10*a* are formed on an outer peripheral surface of the first group barrel 10 at equal intervals. This enables the first group barrel 10 to non-rotatively move in the optical axis direction within the area in which the slot portions 34*d* in the advancing cylinder 34 are formed.

Slot portions 34*e* are formed in a cylindrical surface of the advancing cylinder 34 and parallel to the optical axis direction. Two cam follower portions 20*a* and a movable follower 23 are fitted into the slot portions 34*e*; the cam follower portions 20*a* and movable follower 23 are provided on an outer peripheral surface of the second group barrel 20. This enables the second group barrel 20 to non-rotatively move in the optical axis direction within the area in which the slot portions 34*e* in the advancing cylinder 34 are formed.

The three elliptical protruding portions 10*a* are provided on the outer peripheral surface of the first group barrel 10 at equal intervals. A cam follower 35 is pressed in the center of each of the elliptical protruding portions 10*a*. The cam followers 35 move along cam grooves 32*b* formed in the inner peripheral surface of the moving cam ring 32. Thus, rotatively driving the moving cam ring 32 moves the first group barrel 10 along the cam grooves 32*b* in the moving cam ring 32 in the optical axis direction because of the rotational regulation on the first group barrel 10 (see FIG. 4).

Cam follower portions 20*a* and a cam follower hole 20*b* (see FIG. 4) are formed on the outer peripheral surface of the second group barrel 20. A movable follower 23 and a follower spring 24 are also incorporated into the outer peripheral surface of the second group barrel 20; the movable follower 23 and follower spring 24 are fitted into the cam follower hole 20*b*. The cam follower portions 20*a* and movable follower 23 move along cam grooves 32*c* formed in the inner peripheral surface of the moving cam ring 32. Thus, rotatively driving the moving cam ring 32 moves the second group barrel 20 along the cam grooves 32*c* in the moving cam ring 32 in the optical axis direction because of the rotational regulation on the second group barrel 20 (see FIG. 4).

Now, a detailed description will be given of the configuration of the lens barrier and lens barrier driving mechanism in the lens barrel.

Figure 5:
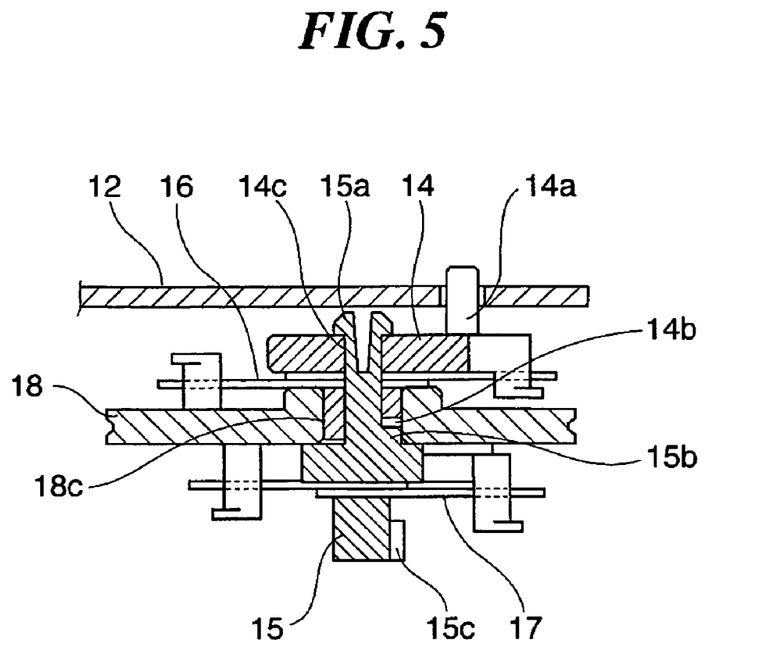
FIG. 5 is a sectional view showing the configuration of a barrier driving lever shown in FIG. 1.
Figure 6:
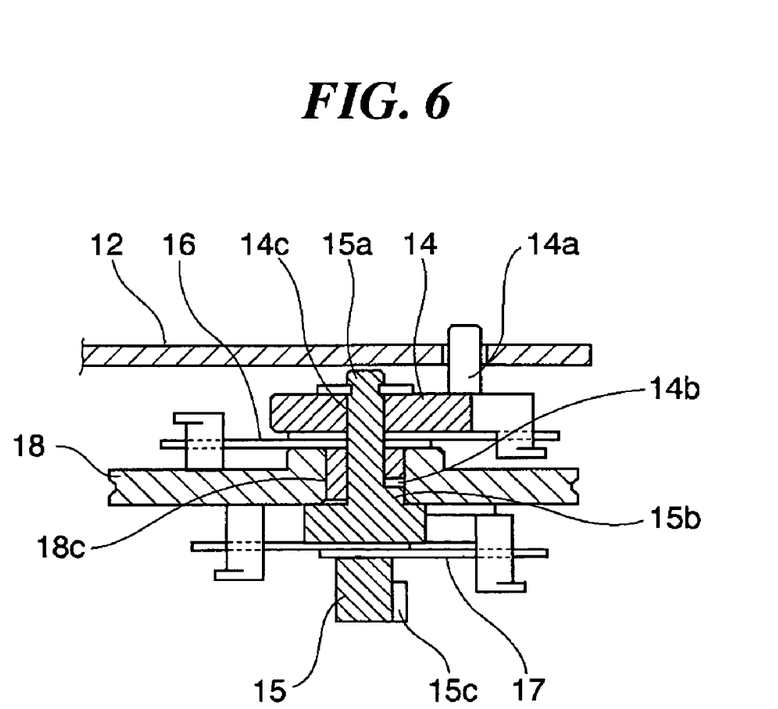
FIG. 6 is a sectional view showing the configuration of the barrier driving lever shown in FIG. 1.
Figure 7A:
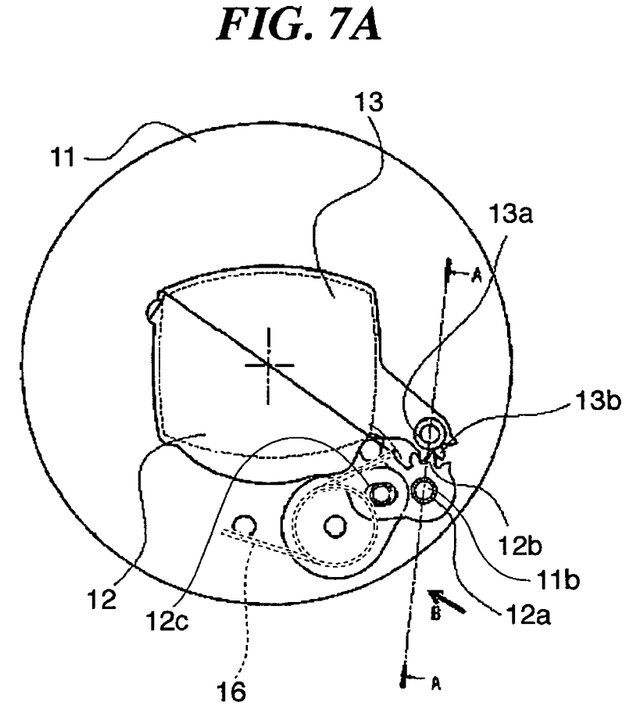
FIG. 7A is a diagram showing that lens barriers are closed.
Figure 7B:
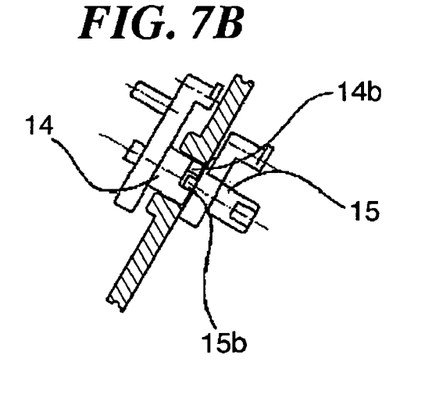
FIG. 7B is a diagram showing how the two barrier driving levers are arranged.
Figure 7C:
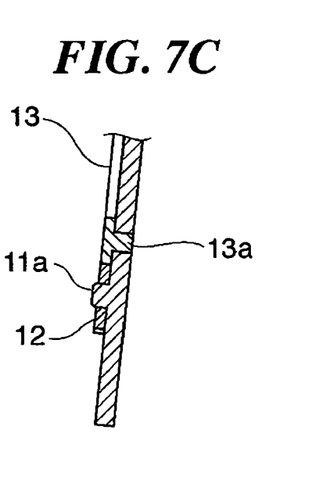
FIG. 7C is a diagram showing how the two lens barriers are arranged.
Figure 8:
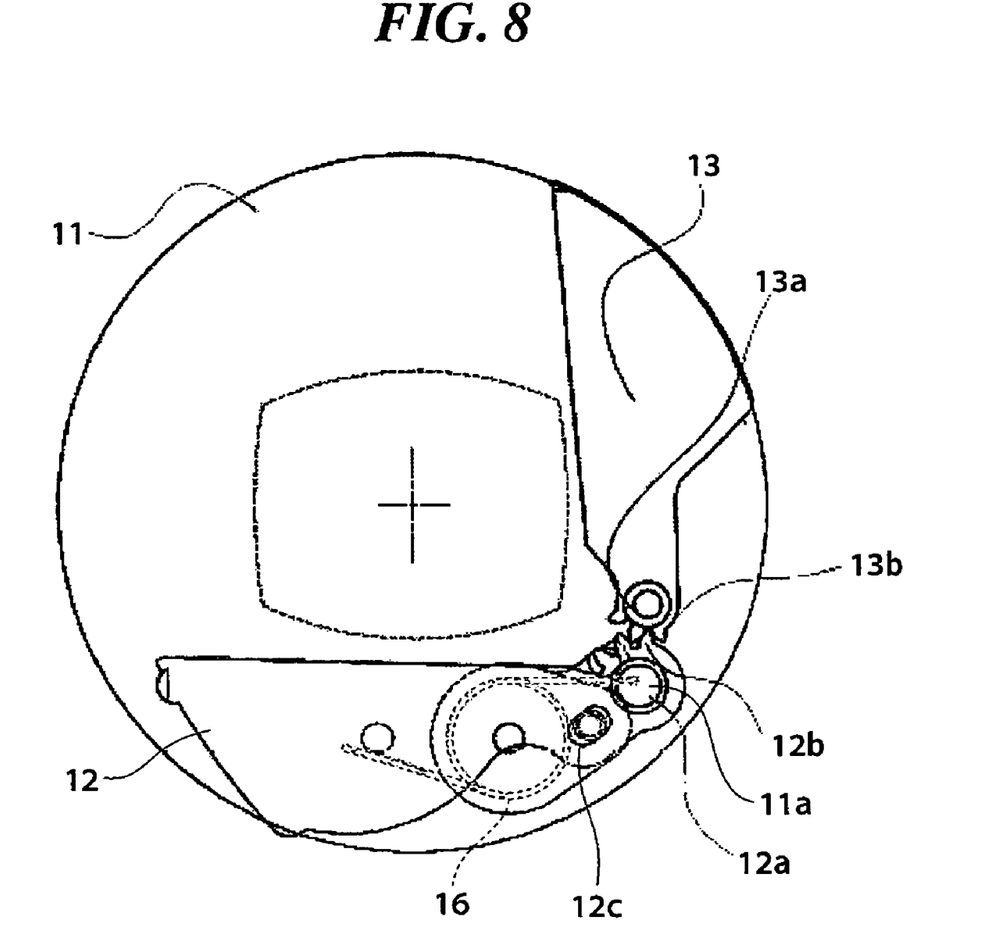
FIG. 8 is a diagram showing that the lens barriers are open.

FIGS. 5 and 6 are sectional views showing the configuration of the barrier driving levers 14 and 15, shown in FIG. 1. FIG. 7A is a diagram showing that the lens barriers 12 and 13, shown in FIG. 1, are closed. FIG. 7B is a diagram showing how the barrier driving levers 14 and 15 are arranged. FIG. 7C is a diagram showing how the lens barriers 12 and 13 are arranged. FIG. 8 is a diagram showing that the lens barriers 12 and 13 are open.

In FIGS. 1 and 5 to 8, the above first group barrel 10 not only serves as a holding member holding the first lens group 1 but also constitutes a mechanism for drivingly opening and closing the lens barriers 12 and 13, which protect the first lens group 1. The barrier shaft plate 18 is fixed to the barrier base plate 11 by screws or the like. A through-hole 18*c* (see FIG. 5) is formed in the barrier shaft plate 18 so that the barrier driving lever 14 can rotate axially through the through-hole 18*c*. A shaft portion 11*a* and a fitting hole 11*b* (see FIGS. 7A and 7C) are provided on a front surface of the barrier base plate 11.

The lens barrier 12 is provided with a fitting hole 12*a*, a gear portion 12*b*, and a slot 12*c*. The lens barrier 13 is provided with a shaft portion 13*a* and a gear portion 13*b*. The shaft portion 11*a* of the barrier base plate 11 is fitted into the fitting hole 12*a* in the lens barrier 12. The fitting hole 11*b* in the barrier base plate 11 is fitted around the shaft portion 13*a* of the lens barrier 13. The lens barriers 12 and 13 are engaged with each other via the gear portions 12*b* and 13*b* and rotate around the fitting hole 12*a* and shaft portion 13*a*, respectively.

The barrier driving lever 14 is provided with a boss 14a, a recess portion 14b, and a shaft hole 14c. The barrier driving lever 15 is provided with a pawl portion 15a, a projecting portion 15b, and a key portion 15c. The barrier driving lever 14 is fitted into the through-hole 18c in the barrier shaft plate 18. The boss 14a of the barrier driving lever 14 is fitted into the slot 12c in the lens barrier 12. The barrier driving lever 15 is coaxially placed in the shaft hole 14c in the barrier driving lever 14. To incorporate the barrier driving lever 15 into the shaft hole 14c in the barrier driving lever 14, the pawl portion 15a of the barrier driving lever 15 is elastically deformed.

The tip 15a of the barrier driving lever 15 need not necessarily be shaped like a pawl. As shown in FIG. 6, a tightening member such as an E ring or a C ring may be used to incorporate the barrier driving lever 15 into the shaft hole 14c in the barrier driving lever 14.

A barrier closing spring 16 is connected to the barrier driving lever 14 to exert a biasing force acting clockwise in FIG. 7A. A barrier opening spring 17 is connected to the barrier driving lever 15 to exert a counterclockwise biasing force. One end of recess portion 14b of the barrier driving lever 14 abuts against the projecting portion 15b of the barrier driving lever 15.

In this case, the recess portion 14b of the barrier driving lever 14 is formed to be wider than the projecting portion 15b of the barrier driving lever 15. Thus, if the closed lens barriers 12 and 13 are forcibly opened, the other end of recess portion 14b of the barrier driving lever 14 does not abut against the projecting portion 15b of the barrier driving lever 15. When the lens barriers 12 and 13 are in a normal state, the barrier closing spring 16 biases the recess portion 14b to the projecting portion 15b.

The balance between a force exerted by the barrier closing spring 16 and a force exerted by the barrier opening spring 17 is set so that the barrier opening spring 17 exerts a stronger force than the barrier closing spring 16. With no load imposed on the barrier driving lever 15, the barrier driving lever 15 exerts a stronger rotating force than the barrier driving lever 14. The barrel is thus designed so that the rotating force of the barrier driving lever 15 is transmitted to the barrier driving lever 14 to open the lens barriers 12 and 13.

FIGS. 7A to 7C shows the relationship between both lens barriers 12 and 13 and both barrier driving levers 14 and 15 observed while the lens barriers 12 and 13 are closed. Clockwise pivoting of the barrier driving lever 14 transits the state thereof shown in FIG. 7A to the one shown in FIG. 8 to open the lens barriers 12 and 13. Counterclockwise pivoting of the barrier driving lever 14 transits the state thereof shown in FIG. 8 to the one shown in FIG. 7A to close the lens barriers 12 and 13. A detailed description will be given below of the mechanism of opening and closing of the lens barrier.

A key portion 15c (see FIG. 5) is provided at a shaft end of the barrier driving lever 15. When the first group barrel 10 and the second group barrel 20 are closer to and within a predetermined distance from each other in the optical axis direction, the key portion 15c of the barrier driving lever 15 is fitted into the key groove portion 21a (see FIG. 2), formed in the shaft of the transmission member 21 which is supported on the second group barrel 20 and will be described later. However, the key portion 15c is arbitrarily movable in the optical axis direction.

As shown in FIG. 2, the transmission member 21 comprises the key groove portion 21a, the rib portion 21b, and a light shielding portion 21c. The transmission member 21 is supported on the second group barrel 20 and located coaxially with the barrier driving levers 14 and 15, incorporated into the first group barrel 10. The key groove portion 21a of the transmission member 21 engages with the key portion 15c of the barrier driving lever 15. Once the first group barrel 10 and the second group barrel 20 approach each other in the optical axis direction to fit the barrier driving lever 15 into the transmission member 21, the rotating force of the transmission member 21 is transmitted to the barrier driving lever 15.

The transmission member 21 can be pivoted through a predetermined angle that is necessary and sufficient to open and close the lens barriers 12 and 13. Specifically, a penetrating portion is formed in the second group barrel 20 by cutting away a part of the second group barrel 20; the penetrating potion corresponds to an area in which the transmission member 21 is pivoted through the predetermined angle. The penetrating portion penetrates the second group barrel 20 along the optical axis direction. The rib portion 21b of the transmission member 21 is disposed to penetrate the penetrating portion. The transmission member 21 is biased clockwise by a transmission member biasing spring 22.

The light shielding portion 21c of the transmission member 21 serves to cover an area in which the rib portion 21b penetrates the second group barrel 20, that is, the penetrating portion, before the rib portion 21b of the transmission member 21 abuts against the tapered cam portion 30a of the barrel base plate 30, that is, in an image taking enabled state of the image pickup apparatus in which the lens barrel has been mounted. This is expected to produce a light shielding effect.

The rib portion 21b of the transmission member 21 is not engaged with the tapered cam portion 30a of the barrel base plate 30 during photographing with the image pickup apparatus in which the lens barrel has been mounted and is engaged with the tapered cam portion 30a in an image taking disabled state. In the image taking disabled state, the barrier driving lever 15 is fitted into the transmission member 21 before the rib portion 21b of the transmission member 21 engages with the tapered cam portion 30a of the barrel base plate 30.

Figure 9:
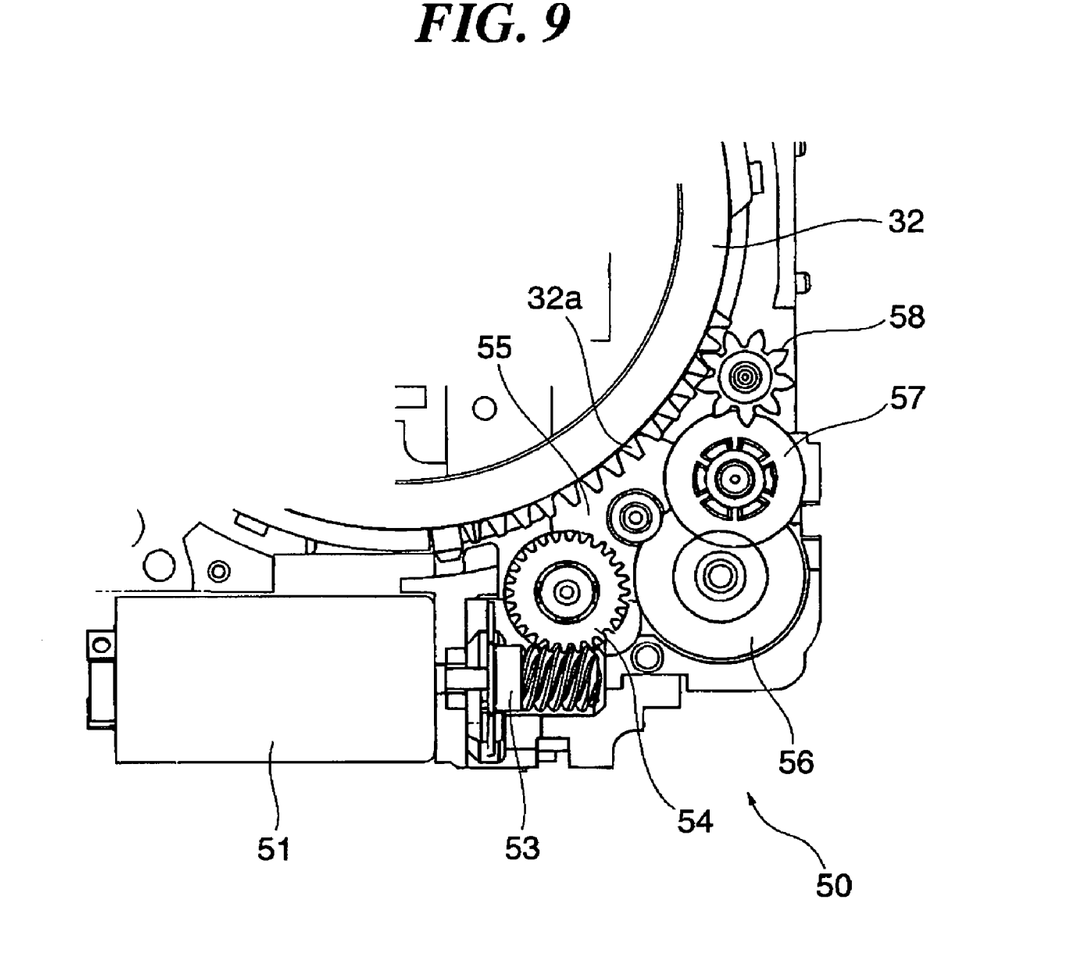
FIG. 9 is a diagram showing how gears of a zoom gear unit are arranged.
Figure 10A:
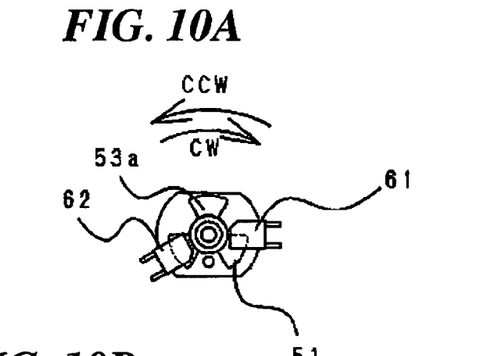
FIG. 10A is a diagram showing how a photo interrupter for a worm gear shown in FIG. 9 is placed.
Figure 10B:
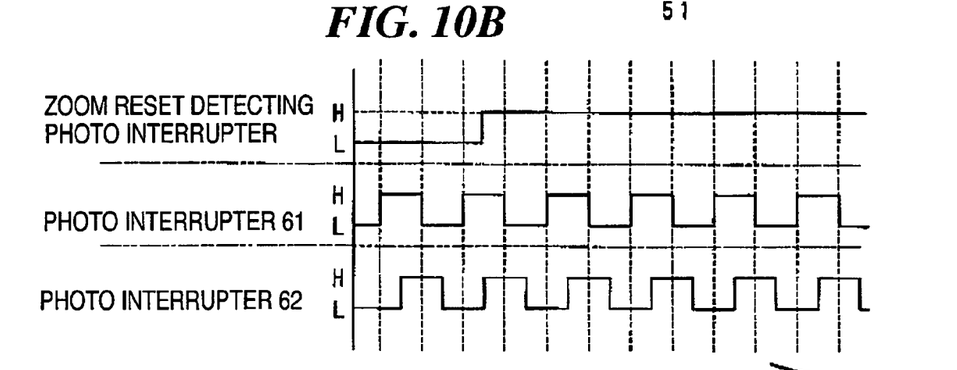
FIG. 10B is a diagram showing the output waveform of the photo interrupter obtained when the worm gear shown in FIG. 9 rotates clockwise.
Figure 10C:
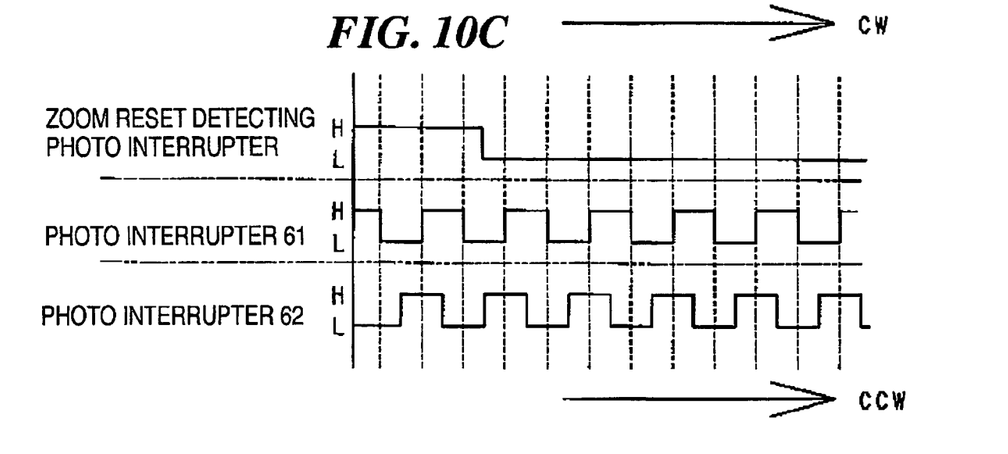
FIG. 10C is a diagram showing the output waveform of the photo interrupter obtained when the worm gear shown in FIG. 9 rotates counterclockwise.
Figure 11:
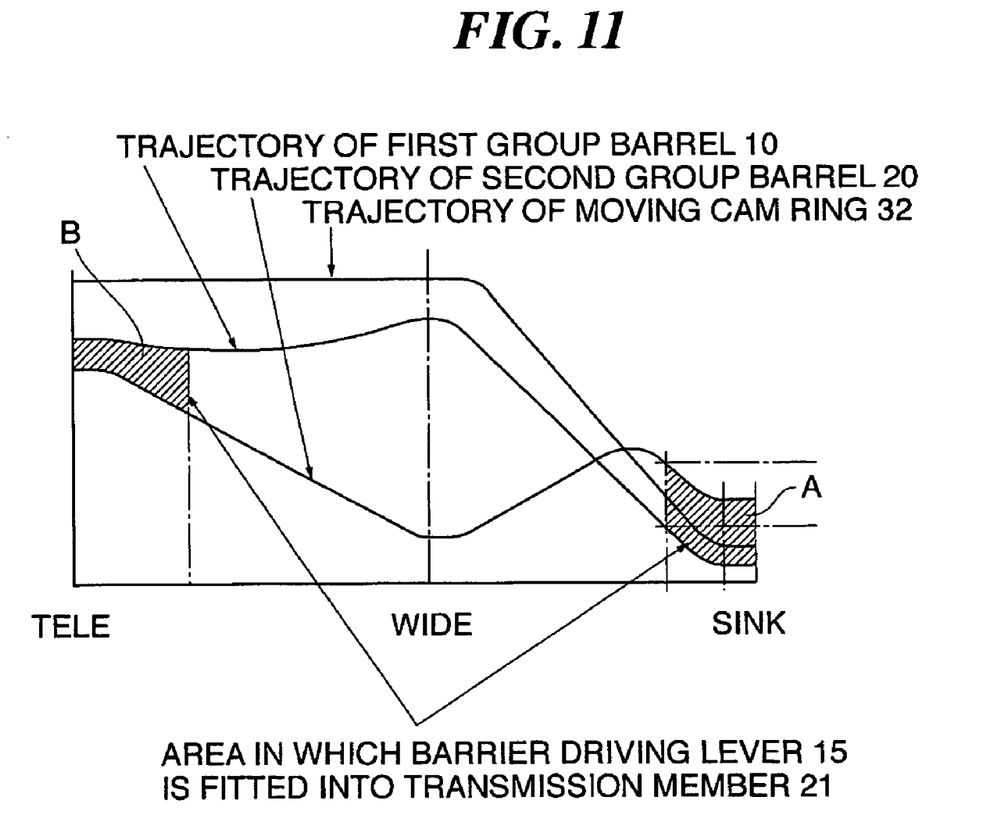
FIG. 11 is a diagram showing movement trajectories of the moving cam ring, first group barrel, and second group barrel which are shown in FIG. 1.

FIG. 9 is a diagram showing how gears of a zoom gear unit are arranged. FIG. 10A is a diagram showing how a photo interrupter for a worm gear shown in FIG. 9 is placed. FIG. 10B is a diagram showing the output waveform of the photo interrupter obtained when the worm gear shown in FIG. 9 rotates clockwise. FIG. 10C is a diagram showing the output waveform of the photo interrupter obtained when the worm gear shown in FIG. 9 rotates counterclockwise. FIG. 11 is a diagram showing movement trajectories of the moving cam ring, first group barrel, and second group barrel which are shown in FIG. 1.

In FIGS. 9 to 11, a zoom gear unit 50 comprises a DC motor 51, a worm gear 53, and gears 54 to 58 and is incorporated into the lens barrel. The DC motor 51 is fixed to a gear base by screws or the like. The worm gear 53 is fitted around the shaft of the DC motor 51. The worm gear 53 engages with the gear 54, and the gears 54 to 58 sequentially engage with one another. The gear 58 engages with the gear teeth 32a of the moving cam ring 32. Driving the DC motor 51 rotates the worm gear 53 and thus the gears 54 to 58. As a result, the moving cam ring 32 rotates.

The worm gear 53 is provided with three propellers 53a as shown in FIG. 10A. Photo interrupters 61 and 62 are disposed near the three propellers 53a of the worm gear 53 and opposite each other across a predetermined slit. The zoom gear unit 50 extracts the rotative driving force of the DC motor 51 via the worm gear 53 and gears 54 to 58 to increase rotational torque. The rotational torque is then transmitted to the moving cam ring 32 via the gear 58 to generate power required to drive the lens barrel.

Rotation of the worm gear 53 around a shaft passes the three propellers 53a through the slits between the photo interrupters 61 and 62. The passage of the propellers 53a cause photo diodes in the photo interrupters 61 and 62 to convert an optical signal indicating whether or not light is blocked, into an electric pulse signal. A controller (not shown) of the image pickup apparatus in which the lens barrel is mounted integrates the electric pulse signals to determine the rotation angle of the moving cam ring 32. The controller thus calculates the focal distances of the image-taking optical system for telescope- and wide-angle-side image taking.

The combination of the components shown in FIGS. 1 to 10A constitutes the lens barrel (barrel unit) of the present embodiment.

Now, a detailed description will be given of the operation of the lens barrel of the present embodiment configured as described above and of the image pickup apparatus in which the lens barrel is mounted.

It is assumed that the image pickup apparatus is "powered off" and that the lens barrel is "sunken". When the image pickup apparatus is then powered on, a current flow through the DC motor 51 to rotate the worm gear 53 clockwise (CW), which rotates the gears 54 to 58. As a result, the moving cam ring 32 engaged with the gear 58 starts to rotate counterclockwise (CCW). Then, as described above, the moving cam ring 32 rotatively moves in the optical axis direction following the path of the cam groove 31a, formed in the inner periphery of the fixed cylinder 31. The first group barrel 10 and the second group barrel 20 correspondingly move in the optical axis direction following the path of the cam grooves 32b and 32c, formed in the inner periphery of the moving cam ring 32.

FIG. 11 shows the positional relationship among the moving cam ring 32, the first group barrel 10 and the second group barrel 20. Within a shaded area A between a sink area and a wide area which are shown in FIG. 11, the relationship between the relative positions of the first and second group barrels 10 and 20 remains almost unchanged. The barrier driving lever 15 remains fitted in the transmission member 21, while the second group barrel 20 and the barrel base plate 30 gradually separate from each other.

The balance between a force exerted by the transmission member biasing spring 22, a forces exerted by the barrier closing springs 16 and a force exerted by opening spring 17 results in a spring force acting to open the lens barriers 12 and 13; the transmission member biasing spring 22 biases the transmission member 21. The gradual separation between the second group barrel 20 and the barrel base plate 30 opens the lens barriers 12 and 13.

Once the lens barriers 12 and 13 are completely opened, the relationship between the relative positions of the first and second group barrels 10 and 20 changes. At this time, the key portion 15c of the barrier driving lever 15 connected to the first group barrel 10 separates from the key groove portion 21a in the transmission member 21 connected to the second group barrel 20. However, under these conditions, the barrier opening spring 17 exerts a stronger force than the barrier closing spring 16. This keeps the lens barriers 12 and 13 open.

On this occasion, the separated second group barrel 20 and barrel base plate 30 may approach each other again to engage the transmission member 21 with the tapered cam portion 30a of the barrel base plate 30. The reason is as follows. The penetrating portion of the second group barrel 20 is only partly covered with the light shielding portion 21c of the transmission member 21. However, the tapered cam portion 30a of the barrel base plate 30 advances into the free area (non-covered area) of the penetrating portion. Thus, both the light shielding portion 21c of the transmission member 21 and the tapered cam portion 30a of the barrel base plate 30 shield the penetrating portion of the second group barrel 20.

In the present embodiment, in the image taking enabled area (wide area), the transmission member 21 and the tapered cam portion 30a of the barrel base plate 30 remain separate from each other. When the image taking enabled area is reached, the spring force of the transmission member biasing spring 22 biases the light shielding portion 21c of the transmission member 21 to a position where the light shielding portion 21c covers the space in the second group barrel 20 into which the tapered cam portion 30a of the barrel base plate 30 advances. This blocks light involved in light leakage or ghosts and which affects adversely the optical performance.

Now, it is assumed that the operator has operated a zoom button (not shown) on the image pickup apparatus to move the image-taking optical system from wide area to telescope area, thus performing the corresponding scale changing operation. A current flows through the DC motor 51 to rotate the worm gear 53 clockwise (CW), which rotates the gears 54 to 58. As s result, the moving cam ring 32 engaged with the gear 58 starts rotating counterclockwise (CCW). On this occasion, the first group barrel 10 and second group barrel 20 follow the movement trajectories shown in FIG. 11 move to the telescope area, thus performing the corresponding scale changing operation.

In a shaded area B between a certain area and an end of the telescope area, the key portion 15c of the barrier driving lever 15 is fitted into the key groove portion 21a of the transmission member 21. However, in the area B, the relationship between the relative positions of the barrier driving lever 15 and transmission member 2 at the moment of separation of the barrier driving lever 15 and transmission member 21 during the transition from the sink area to the wide area is maintained intactly. This allows the key portion 15c of the barrier driving lever 15 to be fitted into the key groove portion 21a of the transmission member 21 without any stress. Further, on this occasion, the member corresponding to the tapered cam member 30a of the barrel base plate 30 which drives the lens barriers 12 and 13 does not advance into the penetrating portion of the second group barrel 20. This prevents the lens barriers 12 and 13 from being closed.

Now, it is assumed that the operator has operated the zoom button (not shown) on the image pickup apparatus to move the image-taking optical system from telescope area to wide area, thus performing the corresponding scale changing operation. A current flows through the DC motor 51 to rotate the worm gear 53 counterclockwise (CCW), which rotates the gears 54 to 58. As s result, the moving cam ring 32 engaged with the gear 58 starts rotating clockwise (CW). On this occasion, the first group barrel 10 and second group barrel 20 follow the movement trajectories shown in FIG. 11 to move from telescope area to wide area, thus performing the corresponding scale changing operation.

Between a certain area and the wide area, an area is present in which the key portion 15c of the barrier driving lever 15 and the key groove portion 21a of the transmission member 21 which have been fitted together are separated from each other. However, in this area, the lens barriers 12 and 13 need not be driven. Consequently, image taking is not affected.

Now, it is assumed that the operator powers off the image pickup apparatus. A current flows through the DC motor 51 to rotate the worm gear 53 counterclockwise (CCW), which rotates the gears 54 to 58. As s result, the moving cam ring 32 engaged with the gear 58 starts rotating clockwise (CW). On this occasion, the first group barrel 10 and second group barrel 20 follow the movement trajectories shown in FIG. 11 to move from wide area to sink area.

In a shaded area A between a certain area and an end of the sink area, the key portion 15c of the barrier driving lever 15 is fitted into the key groove portion 21a of the transmission member 21. Once this area is reached, the rib portion 21b of the transmission member 21 starts to abut against the tapered cam portion 30a of the barrel base plate 30. The transmission member 21 starts to pivot along the taper of the tapered cam portion 30a. This pivots the barrier driving lever 15 counterclockwise in FIG. 7A so that a protruding portion 15b of the barrier driving lever 15 leaves the end surface of recess portion 14b of the barrier driving lever 14.

However, since the barrier closing spring 16 acts on the barrier driving lever 14, the closing force of the barrier closing spring 16 drives the barrier driving lever 14 counterclockwise in FIG. 7. This driving force pivots the lens barrier 12 in the closing direction. This also pivots the lens barrier 13 engaged with the lens barrier 12 via the gear portions 12b and 13b, in the closing direction. Consequently, immediately before the first group barrel 10 and second group barrel 20 are driven to the end of the sink area, the lens barriers 12 and 13 are completely closed.

As described above, according to the present embodiment, while the rib portion 21b of the transmission member 21 does not abut against the tapered cam portion 30a of the barrel base plate 30 (image taking enabled state), the light shielding portion 21c of the transmission member 21 and the tapered cam portion 30a of the barrel base plate 30 shields the penetrating portion of the second group barrel 20. This makes it possible to provide a lens barrel that serves to suppress an increase in the number of parts constituting the lens barrier driving mechanism and avoid light leakage from the penetrating portion which is penetrated by the lens barrier driving mechanism, ghosts, and the like; the light leakage and ghosts have often occurred conventionally and may degrade the optical performance.

The type of the image pickup apparatus in which the lens barrel shown in the above embodiment is mounted is not particularly limited. The embodiment is applicable to either a silver film camera or an electronic camera.

This application claims the benefit of Japanese Patent Application No. 2005-193824 filed Jul. 1, 2005, which is hereby incorporated by reference herein in its entirety.

What is claimed is:

1. A lens barrier driving device driving a lens barrier which is disposed on an object side of a lens and is openable and closable, the lens barrier driving device comprising:
    a transmission member that transmits power to a barrier driving member which opens and closes said lens barrier;
    a cam member that is able to engage with said transmission member;
    a first member that holds said cam member; and
    a second member that is provided with a penetrating portion;
    wherein said penetrating portion is disposed between said lens barrier and said first member and said transmission member comprises a rib portion that penetrates said penetrating portion and a light shielding portion that shields incident light through said penetrating portion.

2. The lens barrier driving device according to claim 1, wherein said transmission member is supported by said second member.

3. The lens barrier driving device according to claim 1, wherein said cam member and said transmission member are not engaged with each other during photographing.

4. The lens barrier driving device according to claim 1, wherein said cam member and said transmission member are engaged with each other during non-photographing, and a cam drive between said cam member and said transmission member causes said lens barrier to open or close.

5. The lens barrier driving device according to claim 1, wherein during non-photographing, said barrier driving member and said transmission member are engaged with each other before said cam member and said transmission member are engaged.

6. The lens barrier driving device according to claim 1, wherein during photographing, said cam member advances into said penetrating portion of said second member to shield said penetrating portion together with said light shielding portion of said transmission member.

7. The lens barrier driving device according to claim 6, further comprising biasing means that biases said transmission member so that said light shielding portion shields a space in said penetrating portion into which said cam member advances.

8. A lens barrel comprising:
    at least one lens;
    a lens barrier disposed on an object side of the lens; and
    a lens barrier driving device that includes a transmission member that transmits power to a barrier driving member which opens and closes said lens barrier, a cam member that is able to engage with said transmission member, a first member that holds said cam member; and a second member that is provided with a penetrating portion;
    wherein said penetrating portion is disposed between said lens barrier and said first member and said transmission member comprises a rib portion that penetrates said penetrating portion and a light shielding portion that shields incident light through said penetrating portion.

9. The lens barrel according to claim 8, wherein the lens barrel is of a sink type that can be housed in a housing of an image pickup apparatus.

10. An image pickup apparatus comprising:
    a housing; and
    a lens barrel coupled to the housing;
    wherein the lens barrel includes at least one lens, a lens barrier disposed on an object side of the lens, and a lens barrier driving device that drives the lens barrier;
    wherein the lens barrier device includes a transmission member that transmits power to a barrier driving member which opens and closes said lens barrier, a cam member that is able to engage with said transmission member, a first member that holds said cam member; and a second member that is provided with a penetrating portion; and
    wherein said penetrating portion is disposed between said lens barrier and said first member and said transmission member comprises a rib portion that penetrates said penetrating portion and a light shielding portion that shields incident light through said penetrating portion.

11. An image pickup apparatus as claimed in claim 10, wherein the lens barrel is of a sink type that can be housed in the housing of the image pickup apparatus.

12. A lens barrel comprising:
    a first group barrel supporting a first lens;
    a second group barrel supporting a second lens;
    a barrel base plate supporting the first group barrel and the second group barrel; and
    a lens barrier driving device driving a lens barrier which is disposed on an object side of the first lens and is openable and closable, the device having a transmission member pivoted through a predetermined angle on the second group barrel to transmit power to a barrier driving member which opens and closes said barrier, and a cam member hold on the barrel base plate and engaged with said transmission member during non-photographing, wherein said transmission member comprises a rib portion that penetrates an penetrating portion provided in the second barrel and a light shield portion that shields an incident light through said penetrating portion, the rib portion and the light shield portion are integrated with the transmission member.

13. The lens barrel according to claim 12, wherein said penetrating portion is formed in the second group barrel by cutting away a part of the second group barrel, the penetrating portion corresponding to an area in which the transmission member is pivoted through the predetermined angle.

14. The lens barrel according to claim 8, wherein said transmission member is supported by said second member.

15. The lens barrel according to claim 8, wherein said cam member and said transmission member are not engaged with each other during photographing.

16. The lens barrel driving device according to claim 8, wherein said cam member and said transmission member are engaged with each other during non-photographing, and a cam drive between said cam member and said transmission member causes said lens barrier to open or close.

17. The lens barrel driving device according to claim 8, wherein during non-photographing, said barrier driving member and said transmission member are engaged with each other before said cam member and said transmission member are engaged.

18. The lens barrel driving device according to claim 8, wherein during photographing, said cam member advances into said penetrating portion of said second member to shield said penetrating portion together with said light shielding portion of said transmission member.

19. The lens barrel driving device according to claim 18, further comprising biasing means that biases said transmission member so that said light shielding portion shields a space in said penetrating portion into which said cam member advances.

* * * * *